Figure 1:
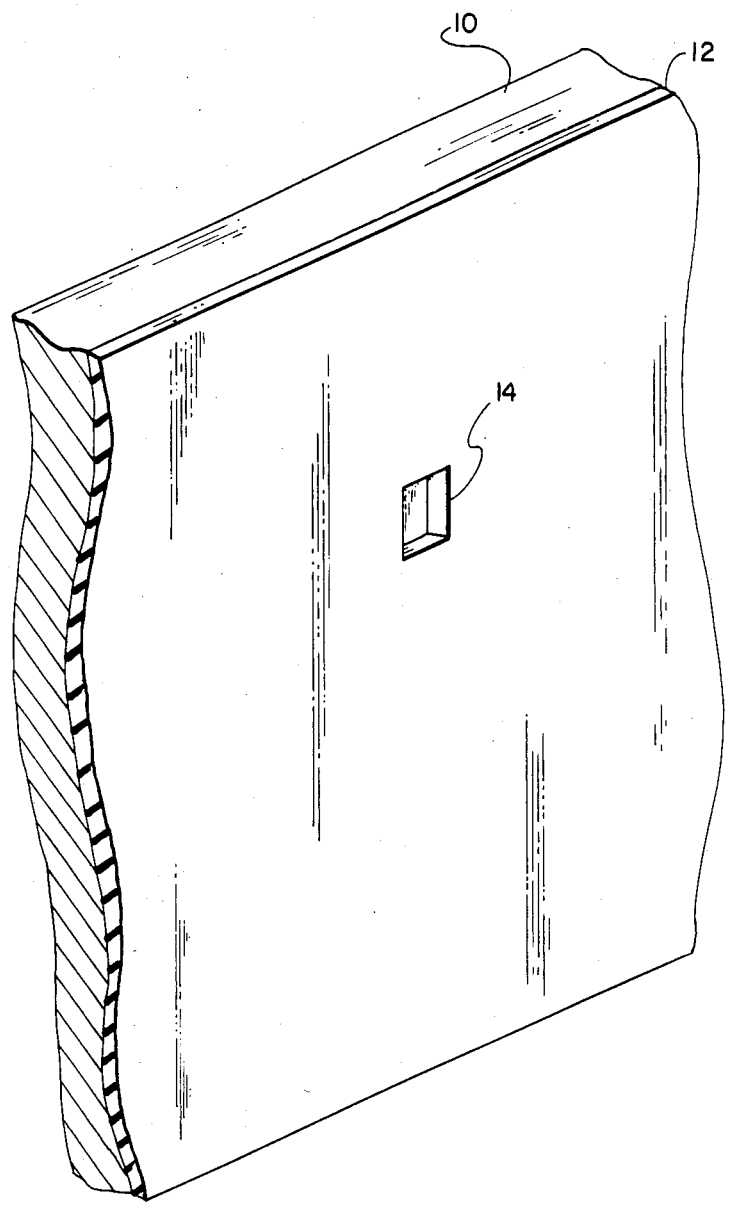

United States Patent [19]
McClure

[11] Patent Number: 4,738,021
[45] Date of Patent: Apr. 19, 1988

[54] METHOD OF MAKING A SLANT GAP THIN-FILM HEAD

[75] Inventor: Richard J. McClure, San Diego, Calif.

[73] Assignee: Eastman Kodak Company, Rochester, N.Y.

[21] Appl. No.: 51,334

[22] Filed: May 18, 1987

Related U.S. Application Data

[62] Division of Ser. No. 669,566, Nov. 8, 1984, Pat. No. 4,701,820.

[51] Int. Cl.⁴ .............................................. G11B 5/42
[52] U.S. Cl. ...................................... 29/603; 360/127
[58] Field of Search .................. 29/603; 360/121–127

[56] References Cited

U.S. PATENT DOCUMENTS

| | | | |
|---|---|---|---|
| 3,613,228 | 10/1971 | Cook et al. | 29/603 |
| 3,893,189 | 7/1975 | Kronn | 29/603 X |
| 3,925,884 | 12/1975 | Case | 29/603 |
| 4,158,213 | 6/1979 | Griffith | 29/603 X |
| 4,546,541 | 10/1985 | Reid | 29/603 |

Primary Examiner—Carl E. Hall
Attorney, Agent, or Firm—Robert F. Cody

[57] ABSTRACT

Slant gap magnetic heads, comprised of back-to-back wedges, are produced by an inventive procedure: Bars of discrete coil-wound thin-film heads—which bars are, cross-sectionally, L-shaped—are stacked with respect to each other. By dicing through the stack of bars at an angle commensurate with the degree of gap-slant, discrete slant gap head structures are produced. With minimal contouring/lapping, such head structures may be finished for use in recording equipment that records chevron-like alternating skewed information tracks.

5 Claims, 11 Drawing Sheets

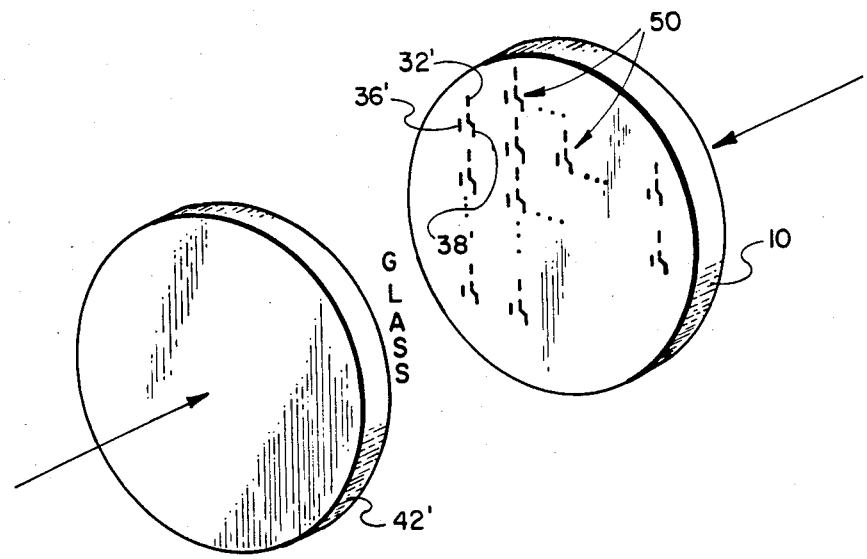
Figure 9
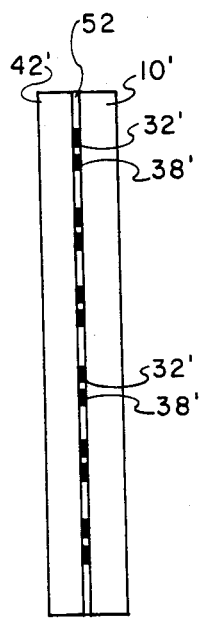 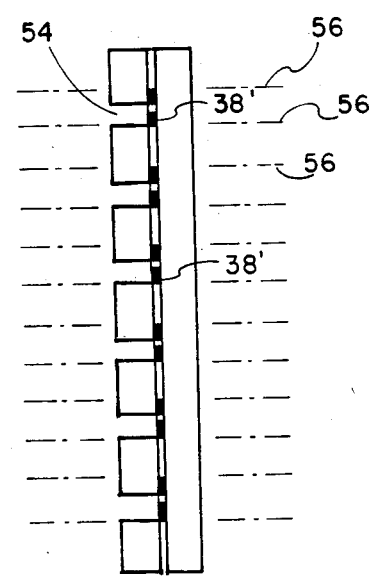
Figure 10      Figure 11

METHOD OF MAKING A SLANT GAP THIN-FILM HEAD

This is a division of application Ser. No. 669,566, filed Nov. 8, 1984 now U.S. Pat. No. 4,701,820.

1. Field of the Invention

This invention relates in general to magnetic heads and, more particularly, to magnetic heads of the type useful with recorders that employ respective oppositely oriented skew angles for information recorded in adjacent tracks.

2. Description Relative to the Prior Art

Video recorders such as the Sony Betamax, and those employing the so-called VHS recording format, record tightly packed video information on magnetic tape, utilizing for such purpose first and second record/play heads in which the record/play gap of the first head is slanted at a positive angle with respect to the direction of relative head-to-tape travel, and in which the gap of the second head is slanted at a negative angle with respect to the direction of relative head-to-tape travel. Because the two heads in question build oppositely oriented skew into the "chevron-like" information tracks which they produce, such tracks may (as a practical matter) be contiguous, i.e. without guard bands therebetween: Since the skewed information recorded by the slant gap of the first head cannot be efficiently played back by the slant gap of the second head, and vice versa, track-to-track isolation between the information in such tracks obtains. Attendantly, the packing density of information so recorded is maximized.

As presently practiced, the manufacture of a video head having a slant gap is a comparatively difficult job, requiring a considerable amount of machining/handling. Such machining/handling, needless to say, can add significantly to the cost of a video recorder incorporating one or more slant gap video heads. It would be desirable, therefore, to adopt a batch fabrication process for the simultaneous manufacture of a large number of slant gap video heads with respective pre-wound coils thereon, thereby to lower the cost of individual heads. Providing such a batch fabrication process, however, is more easily said than done. Certainly, neither of the batch fabrication processes disclosed in U.S. Pat. Nos. 3,893,189 or 4,158,213, and elsewhere, is productive of heads of the type in question. A slant gap head such as disclosed in U.S. Pat. No. 4,399,479, while capable of batch fabrication, is lacking in relation to what is perceived as a requisite head feature, viz. a batch-produced pre-wound coil.

SUMMARY OF THE INVENTION

By virtue of an inventive head manufacturing procedure, slant gap magnetic heads which are characteristic of such procedure are produced. As will be more fully appreciated below, bars of discrete coil-wound thin-film heads—which bars are, cross-sectionally, L-shaped—are stacked with respect to each other, and then (in a presently preferred implementation of the invention) longitudinally shifted, each by the same amount relative to its adjacent bar(s). By dicing through the stack of bars at an angle commensurate with the degree of longitudinal shift, discrete slant gap head structures are produced. With minimal contouring/lapping, such head structures may be finished for use in recording equipment that records chevron-like alternating skewed information tracks.

The invention will be further described with reference to the figures, of which

Figure 14:
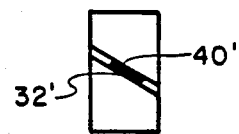

FIGS. 1–8 are a succession of schematic drawings illustrating the fabrication of a coil-wound thin-film magnetic head according to the invention, FIGS. 9–14 are a succession of drawings illustrating procedures for batch processing heads produced pursuant to the drawings of FIGS. 1–8 into discrete coil-wound magnetic heads having respective slant gaps, FIG. 14 depicting a plan view of the medium contacting surface of a head made pursuant to the invention.

Figure 15:
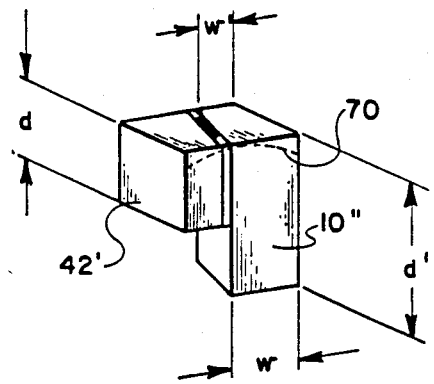
Figure 16:
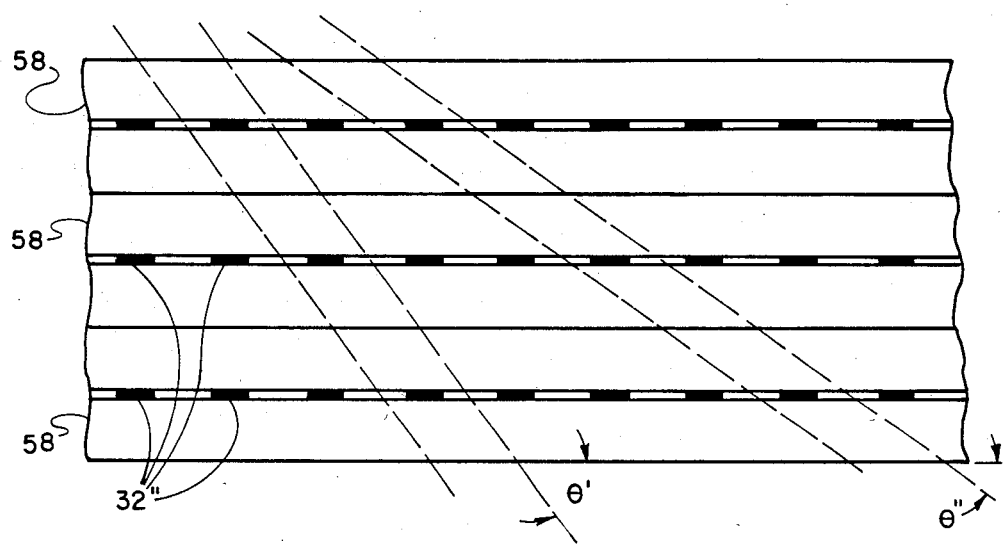

FIG. 15 is a perspective view illustrating a magnetic head according to the invention, and FIG. 16 is a diagram illustrating a variant of the invention.

For sake of clarity, the following description details, first, the fabrication of a single thin-film head, and thereafter details how a batch of such heads may be processed into coil-wound heads with respective slant gaps:

As indicated in FIG. 1, a magnetic substrate 10 has a non-magnetic coating 12 of silicon dioxide ($SiO_2$) deposited thereon. By use of photolithography, a window 14 is formed in the $SiO_2$ coating 12 to the underlying substrate 10. (Photolithography, and complementary mask-etch-deposition techniques, are mature technologies well known to those in the art. See, for example, U.S. Pat. No. 4,158,213. Attendantly, only those procedures incident to a clear understanding of the invention are disclosed herein.) Again by use of photolithography (FIG. 2), a coil 15 of electrically conductive material 16 is deposited about the window 14, the coil 15 having connecting pads 18, 20.

Figure 2:
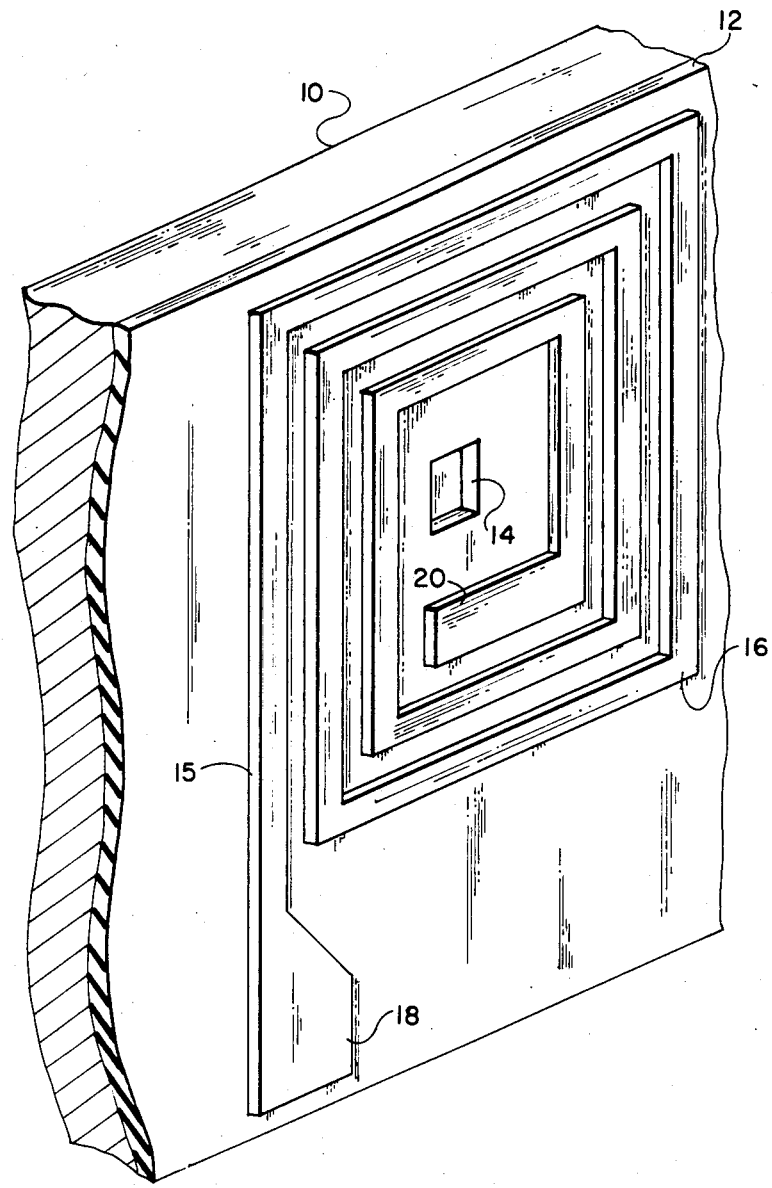
Figure 3:
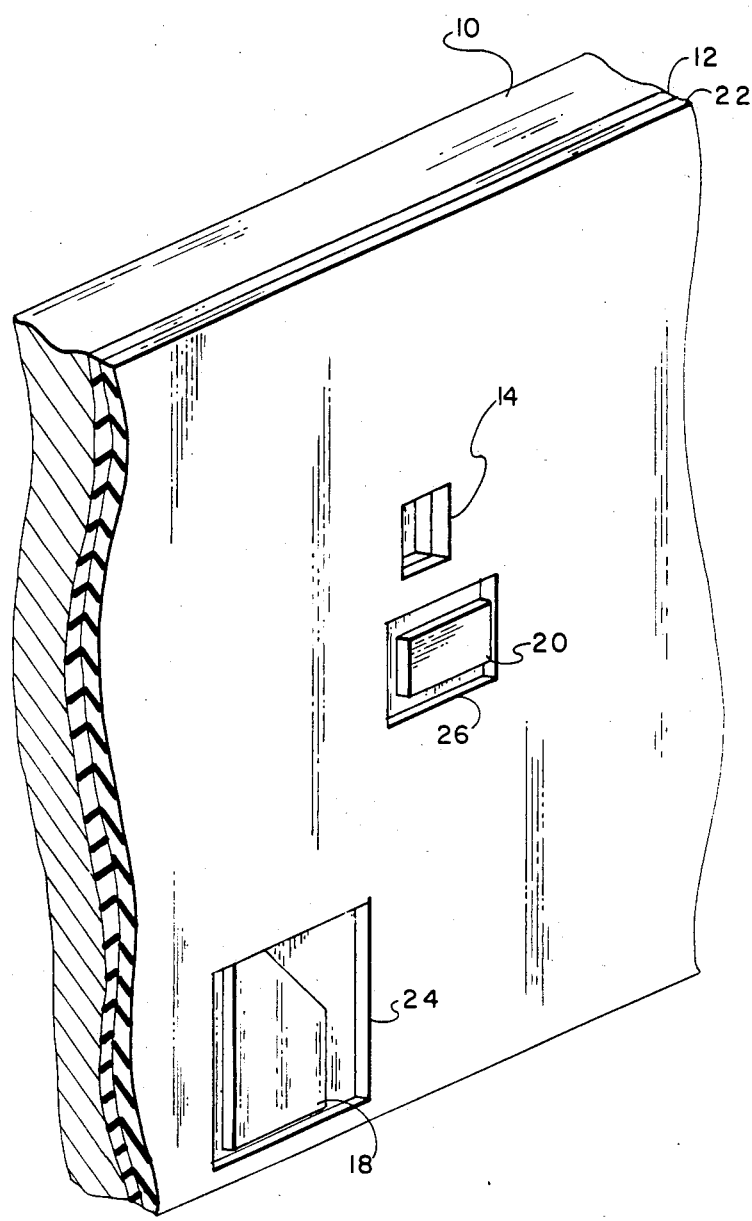
Figure 4:
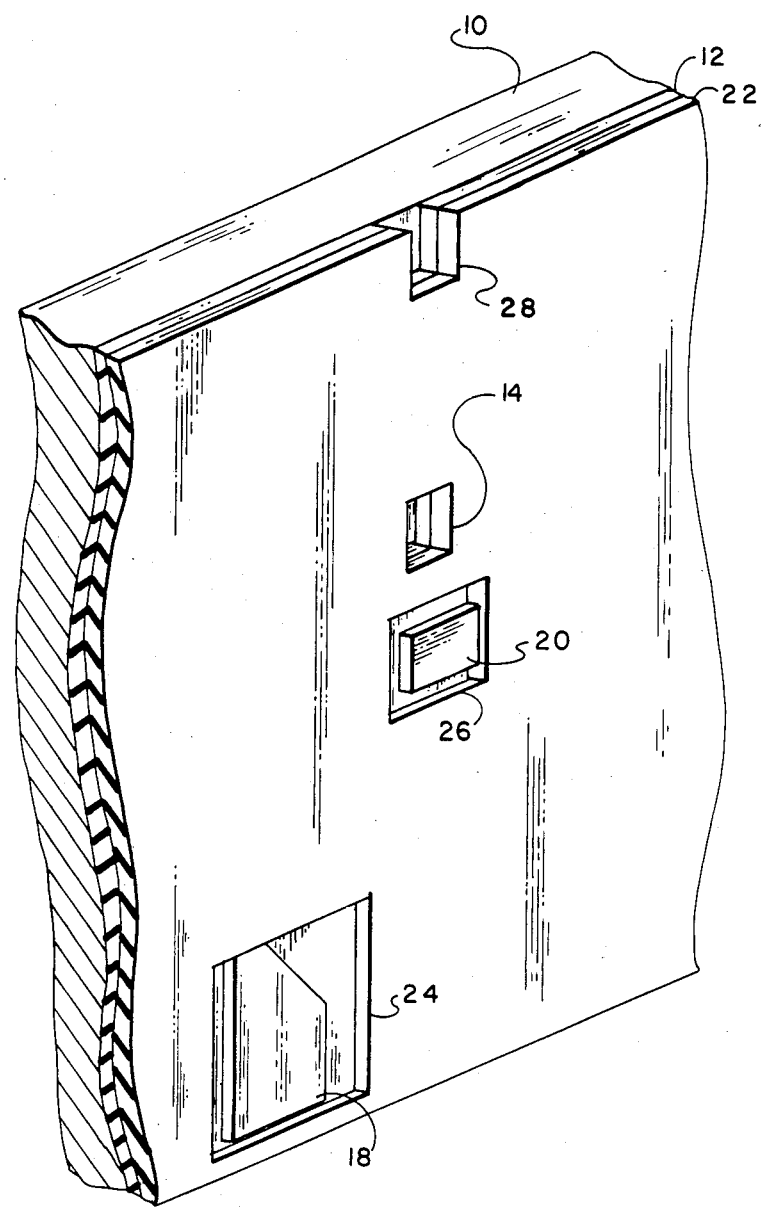
Figure 5:
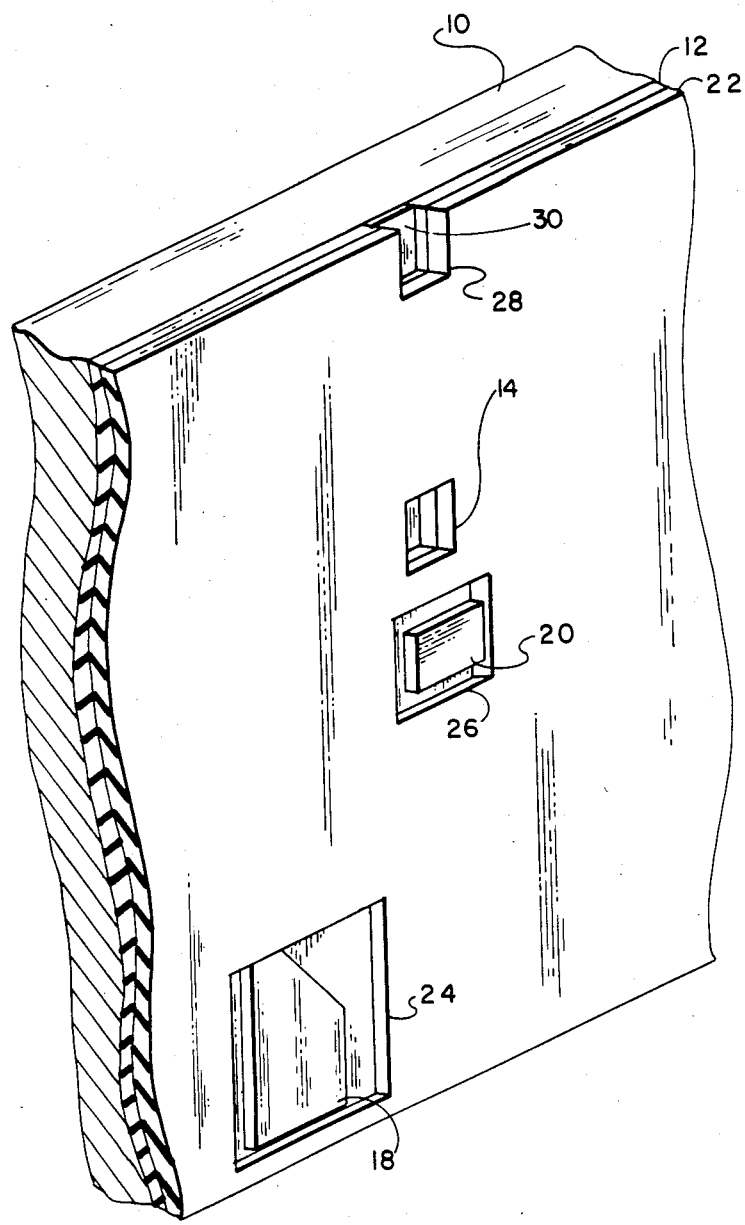
Figure 6:
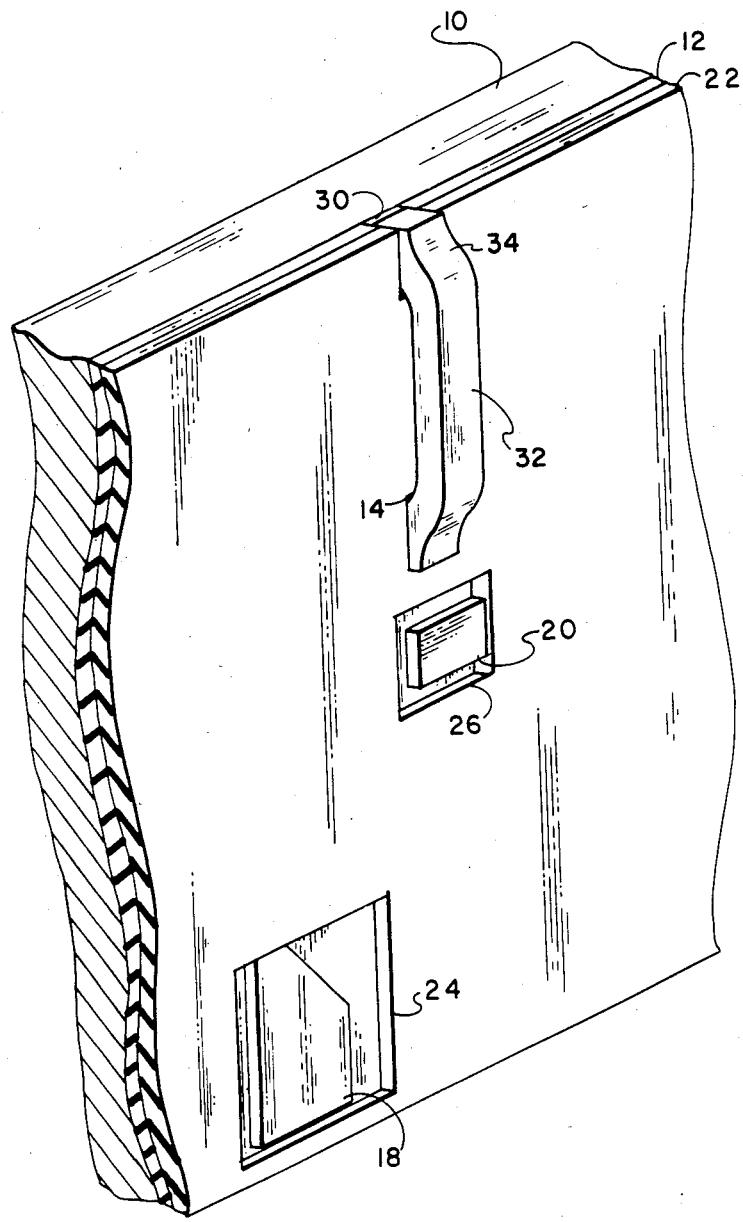

In the interest of electrical isolation of the coil 15 from other head parts (see FIG. 3), a coating of $SiO_2$ 22 is deposited over the structure of FIG. 2, albeit that windows 24, 26 are photolithographically provided to expose the coil connecting pads 18, 20. Then (FIG. 4), a gap region 28 is etched into the $SiO_2$ coatings 12, 22; and into the gap region 28 (FIG. 5) an extremely thin (10–30 microinches or so) coating 30 of "gap-spacer" $SiO_2$ is formed. Thereafter (FIG. 6), a comparatively thick highly permeable (e.g. Permalloy) pole-piece 32 is formed on the $SiO_2$ coating 22 in such a way that it (1) contacts the magnetic substrate 10 via the window 14 and (2) forms a transducer pole tip spaced from the substrate 10 (which acts as a second pole tip) by means of the gap-spacer coating 30.

Figure 7:
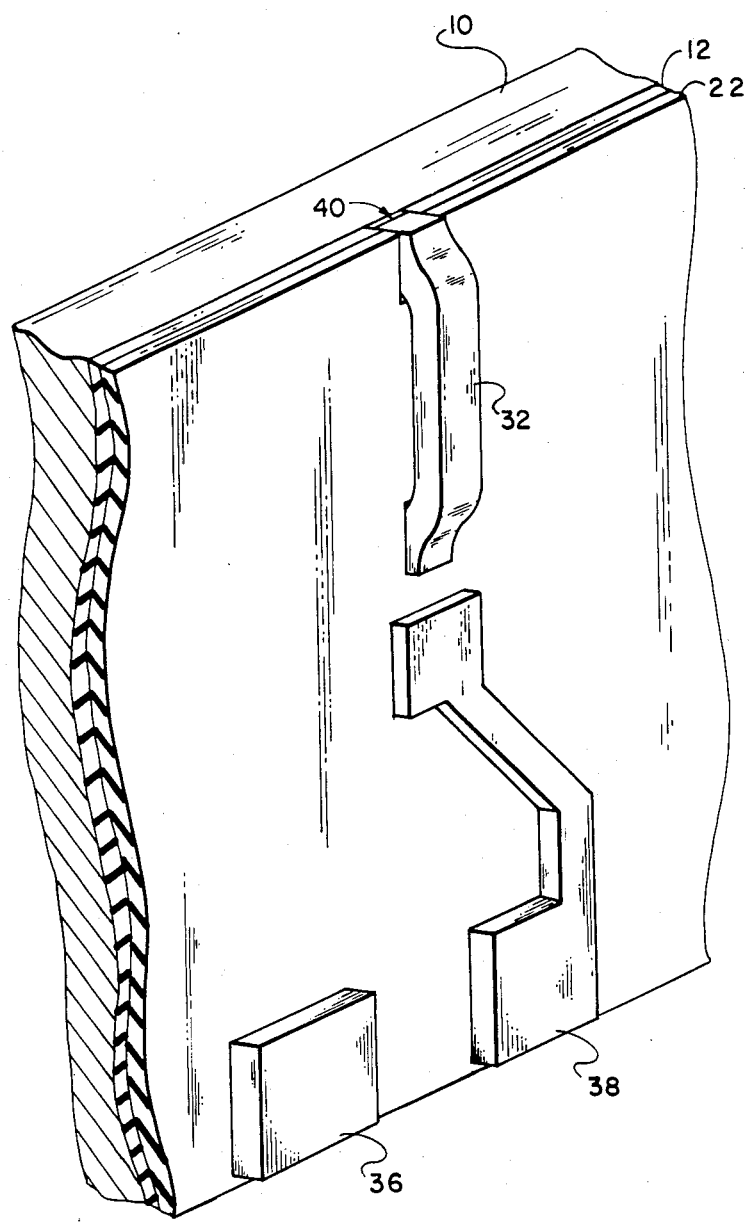
Figure 8:
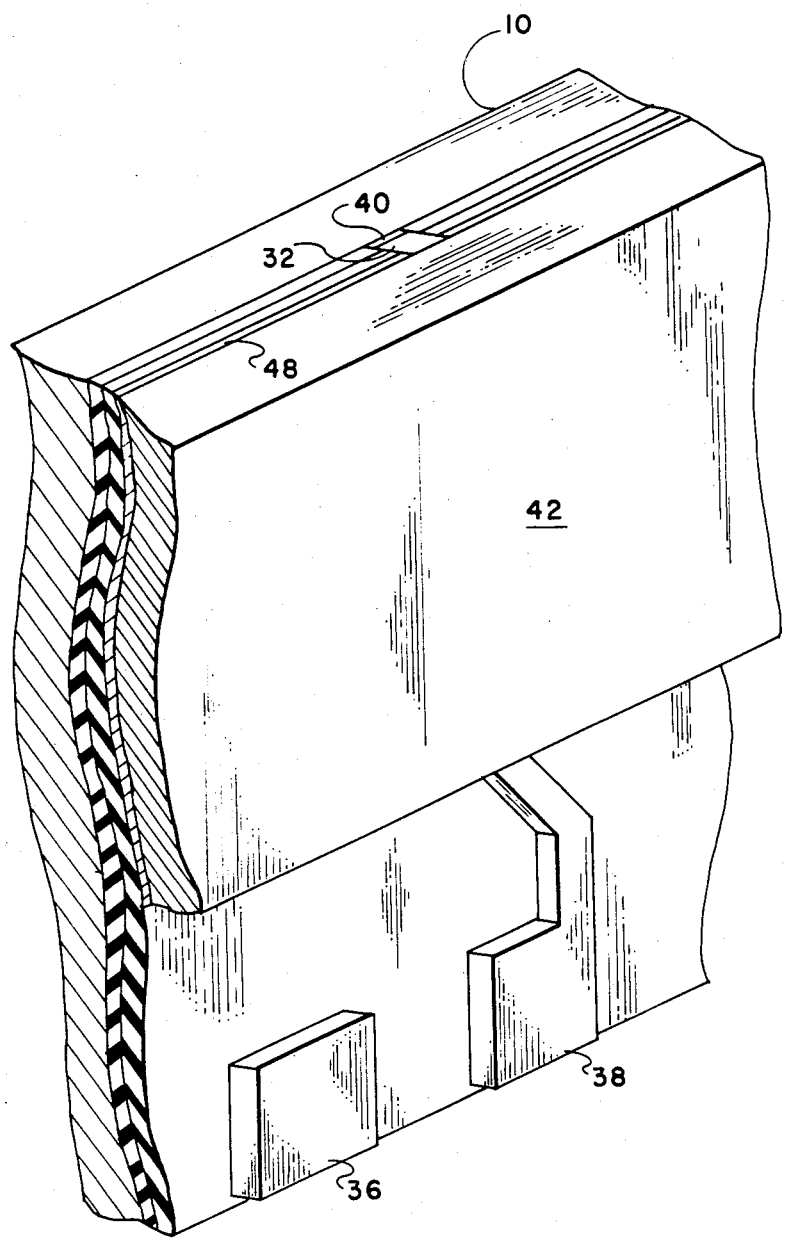

As indicated in FIG. 7, electrically conductive bonding pads 36, 38 are then formed so as to provide contacts for the coil 15 which electromagnetically links the pole piece 32 . . . and whereby magnetic signals may be sensed by and/or applied across the transducer gap 40 of the FIG. 7 structure. Thereafter (FIG. 8), a protective cap 42 of long-wearing material (e.g. Forsterite) is bonded (48) in place over the "working" parts of the FIG. 7 structure, the bonding pads 36, 38 of such structure being, however, left exposed to enable electrical contact to the coil 15.

As indicated above, the head fabrication procedures discussed in connection with FIGS. 1–8 concern the form and structure of a single coil-wound slant gap magnetic head. Pursuant to the invention, however, a batch fabrication procedure is provided for the simultaneous manufacture of a large plurality of such heads. To this end, therefore, reference should now be had to FIGS. 9–12: Given that a large number of thin-film magnetic head structures 50 (made according to the teachings of FIGS. 1–8) are formed on a common substrate 10' as depicted in FIG. 9 (corresponding parts in the various figures have, incidentally, the same character numbers, albeit that some have been primed), a pre-slotted (54) protective cap 42' is then glass (52) bonded to the substrate 10', with the thin-film head structures 50 sandwiched therebetween. See FIG. 10. As indicated, the slots 54 are so positioned as to expose the bonding pads 36', 38' of respective rows of thin-film head structures 50. The sandwich structure of FIG. 10 is then sliced (cut lines 56) into discrete bars, of L-shaped cross-section, each supporting its respective row of thin-film head structures 50. See FIG. 11.

Figure 12:
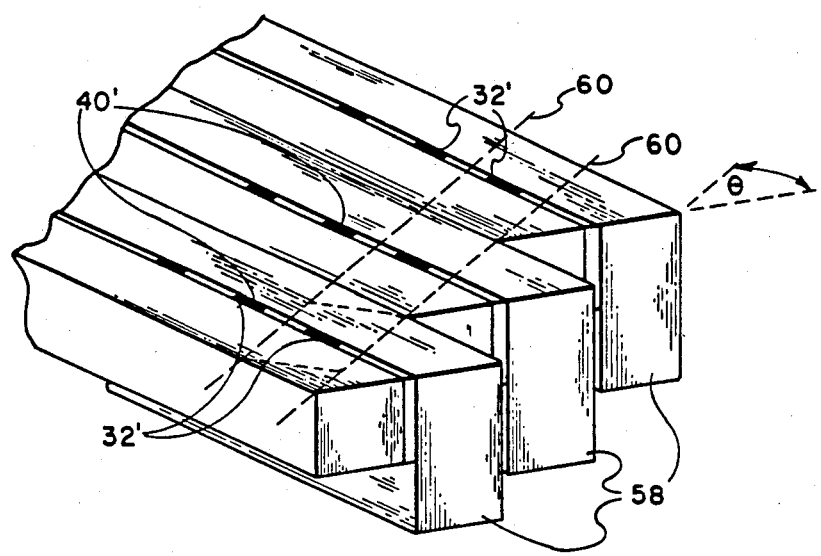
Figure 13:
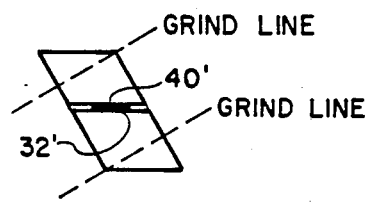

In accordance with the invention, the cross-sectionally L-shaped bars (58) are then stacked and longitudinally shifted with respect to each other. See FIG. 12. The degree of shift has a direct relation to the angle $\theta$ of the slant gap provided to each of the head structures 50. Then, the stacked bars 58 are diced along cut lines 60 which are angled in proportion to the slant gap angle $\theta$, thereby to produce a plurality of discrete parallelogram-faced thin-film core structures. See FIG. 13. (Dicing/bar shifting as in FIG. 12 is productive of core structures with positive slant gap angles. For core structures with negative slant gap angles, dicing/bar shifting may be modified accordingly.) Next, the face of each diced core structure is "rectangularly" ground, thereby to provide a thin-film slant gap head that is functionally the equivalent of existing slant gap heads of conventional form. After contouring the face of the slant gap head of FIG. 14 along contour line 70 (FIG. 15), the head is ready for use, leads being brought to the exposed bonding pads 36, 38.

CHARACTERISTICS OF A THIN-FILM SLANT GAP HEAD MADE PURSUANT TO THE INVENTION

A thin-film magnetic head which is made pursuant to the above description has: 1. a substantially wedge-shaped protective cap 42' that is shallower in depth (d) than the depth (d') of the underlying substrate 10'' upon which the magnetic thin-film pole piece 32' is formed, thereby to provide access to the batch-formed coil of the head, and 2. a substrate 10'' that, as a result of the dice-and-grind operation, is also substantially wedge-shaped, i.e. is wider (w) to one side of the head than at the other side (w') thereof.

Functionally, the head of FIG. 15 works the same as those made by conventional means.

The invention has been described in detail with particular reference to certain preferred embodiments thereof, but it will be understood that variations and modifications can be effected within the spirit and scope of the invention. For example, as indicated in FIG. 16, the longitudinal shift of bars 58 indicated in connection with FIG. 12 may, in some instances, be avoided, albeit that the angles ($\theta'$, $\theta''$) associated with the slant gaps in question will be directly dependent on the closeness between adjacent head structures 32''.

What is claimed is:

1. A method for use in batch fabricating a plurality of slant gap magnetic head structures, said method comprising the steps of
   a. depositing rows and columns of discrete thin-film magnetic head structures on a substrate in such a way that the track-defining widths of the gaps associated with said head structures are all similarly oriented in the direction of said rows,
   b. cutting said substrate, between said rows of head structures, into a plurality of bars, each said bar supporting thereon a plurality of head structures,
   c. stacking said bars with said head structures thereon so that a plurality of said head structures face in the same direction, and
   d. dicing said stack of bars into discrete slant gap head structures by cutting through said stack at respective cut angles commensurate with the degree of slant to be provided to the gaps of said head structures.

2. The method of claim 1 wherein said deposited thin-film head structures comprise respective coil parts and row-oriented bonding pads, and wherein
   a. said method further comprises the step of, prior to cutting said substrate into a plurality of bars, bonding a slotted protective cap to said substrate in such a way that the slots thereof revealingly-expose rows of said pads therethrough, and
   b. the step of cutting said substrate into a plurality of bars is such that it further effects cutting through said cap, thereby to form a plurality of bars of generally L-shaped cross-section.

3. The method of claim 2 including the further step of longitudinally shifting, with respect to each other, and prior to said dicing step, said bars forming said stack thereof, the degree of said longitudinal shift being commensurate with the degree of slant to be provided to the gaps of said head structures.

4. The method of claim 2 including the further step of selectively grinding the diced head structures so as to provide respective generally rectangular media-contacting surfaces for said head structures.

5. The method of claim 1 including the further step of longitudinally shifting, with respect to each other, and prior to said dicing step, said bars forming said stack thereof, the degree of said longitudinal shift being commensurate with the degree of slant to be provided to the gaps of said head structures.

* * * * *